US005659540A

United States Patent [19]
Chen et al.

[11] Patent Number: 5,659,540
[45] Date of Patent: Aug. 19, 1997

[54] APPARATUS AND METHOD FOR DETECTION OF OPERATION ADMINISTRATION AND MANAGEMENT (OAM) CELL LOOPBACK AND PHYSICAL LOOPBACKS IN AN ASYNCHRONOUS TRANSFER MODE (ATM) NETWORK

[75] Inventors: David X. Chen; Deepak Mathur, both of Waterbury; L. David Danenberg, Woodbury, all of Conn.

[73] Assignee: General Datacomm, Inc., Middlebury, Conn.

[21] Appl. No.: 573,244

[22] Filed: Dec. 15, 1995

[51] Int. Cl.$^6$ ............................................. H04J 3/14
[52] U.S. Cl. ................................................. 370/249
[58] Field of Search ........................ 370/13–13.1, 14, 370/15–17, 60, 60.1, 94.1, 94.2, 110.1

[56] References Cited

U.S. PATENT DOCUMENTS 5,166,923  11/1992  Ohmori et al. ......................... 370/15
5,265,088  11/1993  Takigawa et al. ...................... 370/15
5,313,453   5/1994  Uchida et al. .......................... 370/15

OTHER PUBLICATIONS

ITU-T I.610 (Nov. 1995) B-ISDN Operation and Maintenance Principals and Function.

Primary Examiner—Douglas W. Olms
Assistant Examiner—Ajit Patel
Attorney, Agent, or Firm—David P. Gordon

[57] ABSTRACT

A method for identifying and declaring a physical loopback condition upon running an OAM loopback test is provided. The method modifies ITU-T Recommendation I.610. According to the method, an OAM loopback test cell is generated with a correlation tag and a loopback indication value representing an outbound (forward) test cell, with the correlation tag being stored. Upon receiving back an OAM loopback test cell, the value of the loopback indication is determined, and the correlation tag of the incoming OAM loopback test cell is compared with the stored correlation tag. If the correlation tags match and the value of the loopback indication represents a forward test cell, a physical loopback condition is declared. On the other hand, if the correlation tags match and the value of the loopback indication represents a backward test cell, a successful OAM loopback condition is declared. An apparatus including a memory, a management processor, and a header processor for implementing the method of the invention is also disclosed.

15 Claims, 8 Drawing Sheets

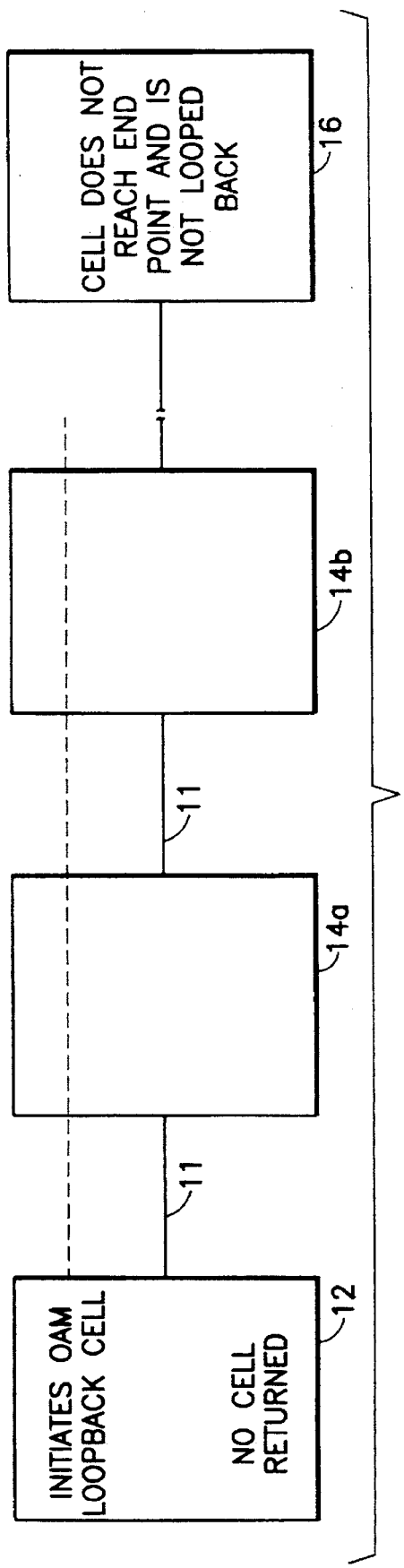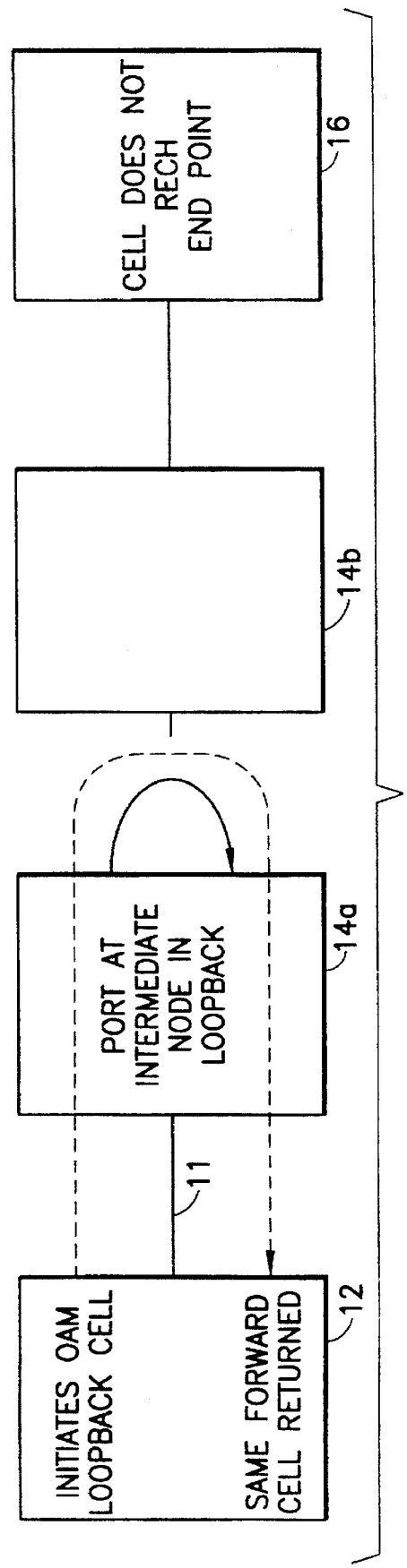

APPARATUS AND METHOD FOR DETECTION OF OPERATION ADMINISTRATION AND MANAGEMENT (OAM) CELL LOOPBACK AND PHYSICAL LOOPBACKS IN AN ASYNCHRONOUS TRANSFER MODE (ATM) NETWORK

BACKGROUND OF THE INVENTION

1. Field of the Invention

The present invention broadly relates to telecommunications. More particularly, the present invention relates to the conducting of diagnostic tests utilizing an OAM loopback cell in an ATM network.

2. State of the Art

Perhaps the most awaited, and now fastest growing technology in the telecommunication field in the 1990's is known as Asynchronous Transfer Mode (ATM) technology. ATM is providing a mechanism for removing performance limitations of local area networks (LANs) and wide area networks (WANs) and providing data transfers with at a speed of on the order of terabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

In order for ATM technology to develop, it must be functional in its own right as well as compatible with existing technology. To be compatible, on the one hand, the ATM cells must be capable of receiving and accommodating voice, video, and LAN and WAN type data; while on the other hand, ATM cells must be capable of adapting to high speed technology such as the synchronous optical network (SONET). In order to meet these and other requirements, a technical group called the ATM Forum which is comprised of numerous corporate representatives has been proposing ATM "standards" which are being provided to ANSI and the ITU-T for their consideration and adoption. Details of those standards may be found in proceedings of the ATM Forum. Of particular interest among the ATM Forum, ANSI and ITU-T documents is a document which is incorporated by reference in its entirety herein and which is dated November 1995 and entitled "B-ISDN Operation and Maintenance Principles and Functions, ITU-T Recommendation I.610 .

As is set forth in Section 2 of Draft Recommendation I.610, Operation, Administration, and Management (OAM) cells provide performance monitoring, defect and failure detection, system protection, defect information, and fault localization functions. Performance monitoring is a function which processes user information to produce maintenance information specific to the user information. The maintenance information is added to the user information at the source of a connection/link and extracted at the sink of a connection/link. Analysis of the maintenance event information at the connection sink allows analysis of the transport integrity. Defect and failure detection is accomplished by continuous or periodic checking and results in the production of various alarms. In the system protection function, the effect of a defect on the transport of user information is minimized by blocking or changeover to other entities, and the failed entity is excluded from operation in order to protect the system. Response to status report requests will also be Given. Fault localization involves a determination by internal or external test systems of a failed entity if defect information is insufficient.

A desirable mechanism for fault localization, pre-service connectivity verification, and on-demand connectivity monitoring is the use of an OAM loopback cell. The ATM layer loopback capability allows for OAM loopback cells to be injected at one location, along a VPC or VCC, and returned at a different location, without having to take the connection out of service. A loopback cell can be injected at any accessible point along the VPC or VCC (i.e., at either end-point or at any connecting point). This cell is looped back at a downstream point specified by the information contained in the OAM cell. The downstream point is either a segment end-point or a connection end-point.

The source point (injection point) sends forward loopback cells. As is discussed in more detail below, the loopback point changes the cell into a backward cell and sends it back upstream. There is a correlation tag (random thirty-two bit field) used to verify the transmitted forward cell against the received backward loopback cell. According to the ITU-T I.610 standard, the default waiting time between the transmission of successive loopback cells on a VPC or VCC is five seconds. The loopback will be considered unsuccessful if the loopback cell is not returned to the originating point within the standard default waiting time of five seconds.

The ATM loopback capabilities are defined in Sections 6.2.1.1.3 (VP Loopback Capability), 6.2.2.1.3 (VC Loopback Capability), and Annex C (Procedures to be performed when receiving Loopback OAM cells), while the format of the loopback OAM cell itself is defined in Section 7.2.4 (Loopback Cell). As set forth in Section 7.1 of the ITU-T Recommendation, the ATM layer OAM cell includes five bytes of header followed by a forty-eight byte OAM Cell Information Field. Details of the five bytes of header include are set forth in Recommendation I.361 which is hereby incorporated by reference herein in its entirety. Recommendation I.361 states that for F4 flow identification, two pre-assigned VCIs are used to distinguish OAM cells meant for VPC end-to-end or VPC segments. These two values are defined in Recommendation I.361. For F5 flow identification, two PTI values are used to distinguish OAM cells for VCC end-to-end or VCC segments. These two values are defined in Recommendation I.361. Turning to the forty-eight bytes OAM Cell Information Field, the first four bits define the OAM cell type; e.g., fault management, performance, management, and activation/deactivation. The next four bits identify the OAM function type; i.e., the type of function performed by the cell within the management type. Following the four bit OAM function type field, forty-five bytes of information pertinent to the function type are sent, followed by a six bit reserved field for future use, and a ten bit error detection code field.

As set forth in Section 7.2.4, the forty-five byte OAM Cell Information field format for a VP/VC end-to-end and segment level loopback is provided (as seen in prior art FIG. 1) to include a one byte loopback indication field, a four byte correlation tag field, a sixteen byte loopback location ID field, an optional sixteen byte source ID, and eight bytes of unused data. According to the standard, the loopback identification field uses the least significant bit as a Boolean indication as to whether or not the cell has already been looped back. Thus, the source point encodes this field as 00000001, while the loop back point changes the encoding to 00000000, thereby avoiding the problem of an infinite loopback. The four-byte correlation tag field is used upon receiving a OAM cell having a 00000000 value in the loopback identification field to correlate the transmitted cell with the received OAM cell; i.e., only upon receiving an OAM cell with a 00000000 value in the loopback identification field will a determination be made as to whether the identification field corresponds to the value placed by the transmitting device into the correlation tag field. The sixteen byte loopback location ID field identifies as an option the connecting point along the virtual connection or connection segment where the loopback is to occur. The value of this field is not subject to standardization and encoding of non-default values (i.e., values other than all ones) in this field is optional. Finally, the sixteen byte optional source ID field can be used to identify the source originating the loopback cell. Again, the default value is all ones, and the value of the field is not subject to standardization.

While the loopback mechanism for OAM cells as defined in Recommendation I.610 works properly in many situations, it has been recognized by the inventors that there exists some situations where a looped back OAM cell will not be identified by the source originating the loopback cell as its own originated cell. In particular, where a physical loopback exists in the network, the OAM loopback test on that connection will fail due to the fact that, although an OAM loopback cell is returned, it is not marked as a "backward" cell; i.e., the value in the loopback identification field will be 00000001 instead of 00000000.

SUMMARY OF THE INVENTION

It is therefore an object of the invention to provide an apparatus and method for recognizing a physical loopback during an OAM loopback test.

It is another object of the invention to provide an apparatus and method for identifying and declaring both physical and OAM loopback conditions.

In accord with the objects of the invention, the method of the invention for identifying and declaring a physical loopback condition upon running an OAM loopback test includes: sending an OAM loopback test cell with a loopback indication value representing an outbound or forward test cell (e.g., 00000001) and with a correlation tag; storing the correlation tag of the sent OAM loopback test cell; upon receiving back an OAM loopback test cell, determining the value of the loopback indication, and comparing the correlation tag of the incoming OAM loopback test cell with the stored correlation tag; and declaring a physical loopback condition if the correlation tags match and the value of the loopback indication represents a forward test cell, and declaring a successful OAM loopback condition if the correlation tags match and the value of the loopback indication represents a backward test cell.

An apparatus for implementing the above-summarized method includes a memory, a management processor, and a header processor which are all typically located on and as part of a circuit board card which interfaces with a backplane switch fabric. The header processor has the functions of: (i) receiving an incoming ATM formatted data stream, (ii) identifying OAM loopback test cells in the ATM formatted data stream, and (iii) forwarding at least the loopback indication value and the correlation tag of the incoming OAM loopback cell to the memory. The management processor has the functions of: (i) generating an OAM loopback cell with an appropriate loopback indication and a correlation tag, (ii) storing a copy of the correlation tag in memory, (iii) inserting the OAM loopback cell into an outgoing ATM formatted data stream, (iv) determining the value of loopback indications placed into the memory by the header processor, (v) comparing the correlation tag of the incoming OAM loopback test cell with the stored correlation tag, (vi) declaring a physical loopback condition if the correlation tags match and the value of the loopback indication represents a forward test cell, and (vii) declaring a successful OAM loopback condition if the correlation tags match and the value of the loopback indication represents a backward test cell.

According to an additional preferred aspect of the invention, the management processor is coupled to a timeout means which provides the management processor with a waiting time during which the return of an OAM loopback cell is awaited. In order to allow for different return cell waiting times., the timeout means is designed to be programmable with a user selecting the desired waiting time via a terminal coupled to the management processor. An accord with another preferred aspect of the invention, the management processor is arranged to be programmable by a user to automatically repeat the loopback test (after a loopback failure) a desired number of times until a return cell is detected and the user is able to observe a successful loopback, or until the test has been repeated unsuccessfully by the number of times indicated.

The objects and advantages of the invention will become apparent to those skilled in the art upon reference to the detailed description taken in conjunction with the provided figures.

BRIEF DESCRIPTION OF THE DRAWINGS

FIGS. 2a–2c are diagrams showing respectively a loopback success, a loopback failure, and a physical loopback.

FIG. 4 is a functional block diagram of the OAM management processor of FIG. 3a.

DETAILED DESCRIPTION OF THE PREFERRED EMBODIMENT

Figure 1:
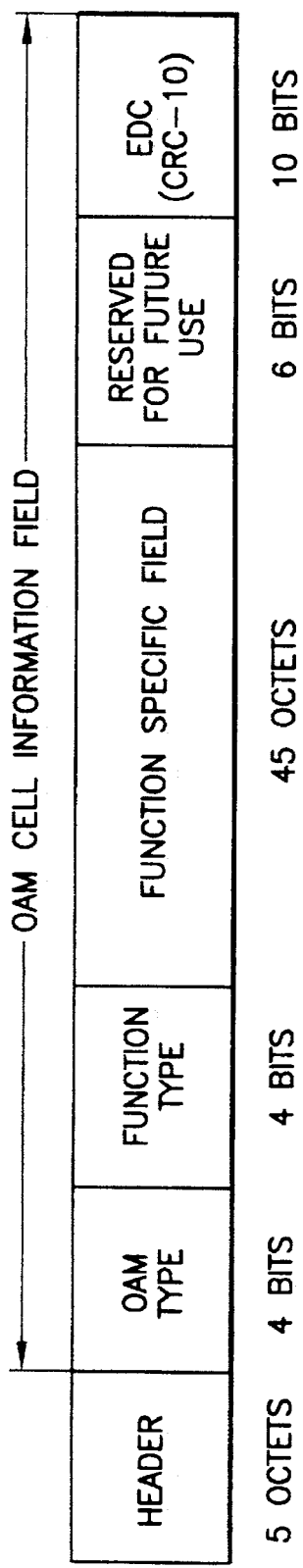
FIG. 1 is a prior art map of an ATM layer OAM cell.
Figure 2A:
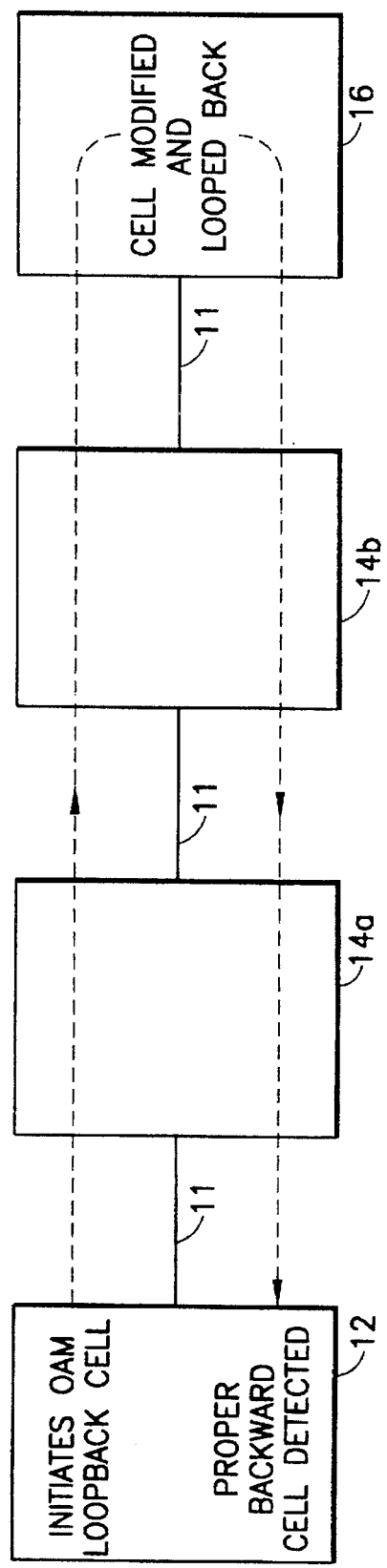

As seen in FIGS. 2a–2c, three basic occurrences can happen in conducting an ATM OAM cell loopback. In a first situation as shown in FIG. 2a, the OAM cell is transmitted via connection 11 from the apparatus initiating the OAM loopback 12, through several nodes or switches 14a, 14b, to the intended receiving apparatus 16. The receiving apparatus 16 modifies the cell by changing the loopback indication value, and sends the modified cell back via the nodes or switches 14a, 14b to the initiating apparatus 12 which determined that a proper "backward" cell is detected. In a second situation as seen in FIG. 2b, where a break or error in the connection as indicated at 17 exists, the OAM loopback cell is transmitted from the initiating apparatus 12 through the nodes or switches 14a, 14b, but does not reach its intended receiving apparatus 16 and is not looped back. Thus, no cell is returned, and the loopback fails. In a third situation as seen in FIG. 2c, where a physical loopback 18 is situated in the connection 11, the OAM loopback cell is transmitted from the initiating apparatus 12 through a node or switch 14a, but is physically looped back to the initiating apparatus 12 without reaching the end point 16. In such a situation, the cell being received at the initiating apparatus 12 is the "forward" cell, as the intended receiving apparatus 16 does not have the opportunity to modify the loopback indication value. It is in this third situation that the prior art apparatus of the art would declare that the loopback failed without recognizing that a physical loopback 18 exists in the intended connection. However, in the method and apparatus of the present invention, the physical loopback is in fact recognized and declared.

Figure 3A:
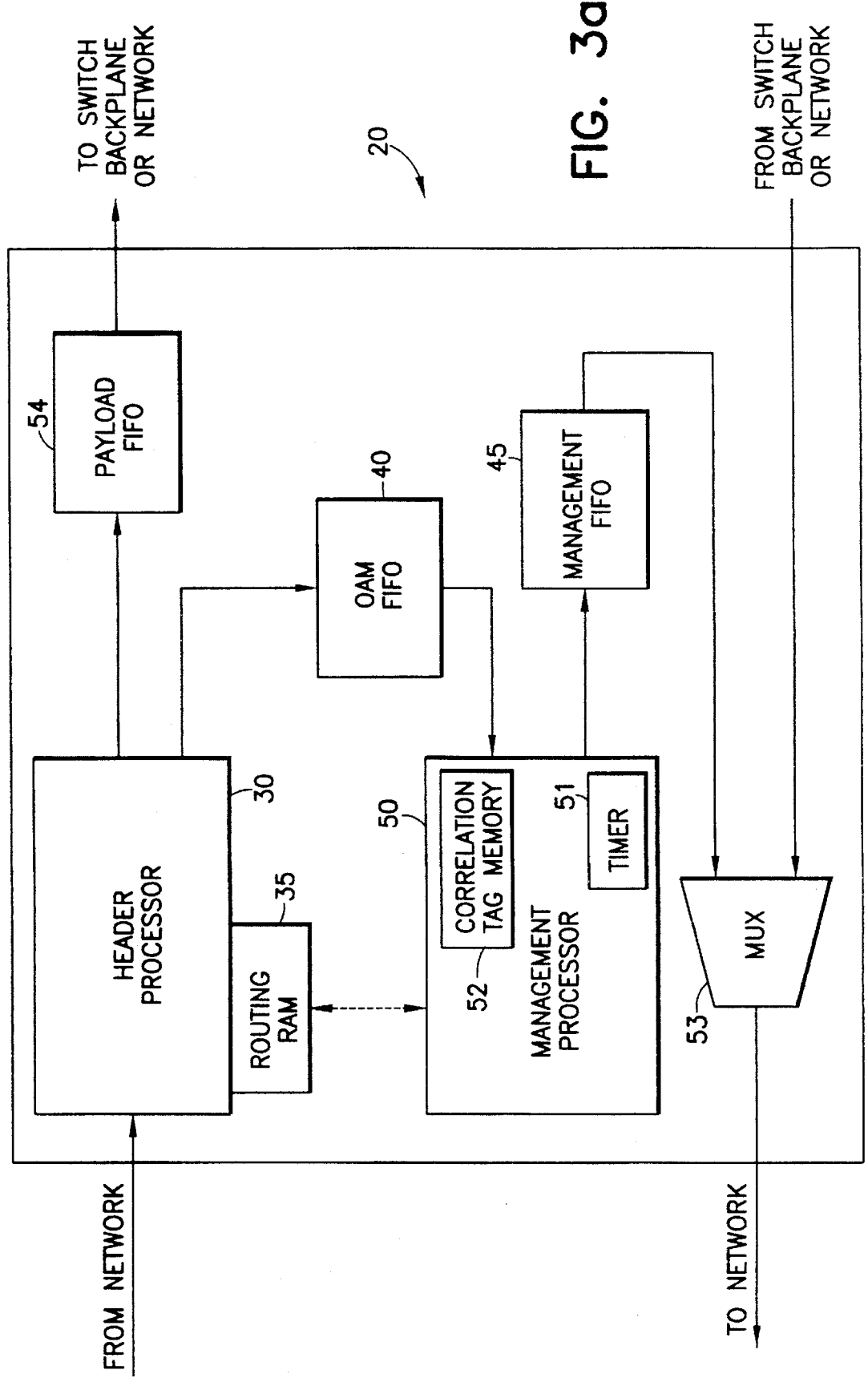
FIG. 3a is a high-level block diagram of the apparatus of the invention which constitutes a portion of a larger ATM processing card.

The apparatus of the invention for identifying physical and OAM loopbacks is seen in high level block diagram form in FIG. 3a. The apparatus 20, which is typically contained on a circuit board (not shown), is equipment preferably substantially as is available from General DataComm, Inc. of Middlebury, Conn. as an APEX slot controller card. For purposes of the invention, the apparatus can be viewed as containing a header processor 30 with a routing RAM 35, an OAM FIFO 40, a management FIFO 45, a management processor 50 with an associated timer 51 and memory 52, a multiplexer 53 and a payload FIFO 54. Effectively, ATM data from the network is received at the header processor 30 via appropriate interface circuitry (not shown) such as a line interface module as set forth in co-owned U.S. Pat. No. 5,436,893 to Barnett. The header processor 30 looks at the five byte header of each incoming cell to determine whether the cell is an OAM cell, or a regular data cell. Depending upon the type of cell, and based upon information stored in the routing RAM 35, the header processor either forwards the cell to the OAM FIFO 40 or the payload FIFO 54, or discards the cell. Cells forwarded to the payload FIFO 54 are typically then forwarded to a switch, backplane, or network as indicated and discussed in more detail below with respect to FIG. 3b. OAM cells, on the other hand, which are forwarded to the OAM FIFO 40 are analyzed and processed by the management processor in a manner discussed in more detail below with respect to FIGS. 4–6. It should be appreciated that where the apparatus of FIG. 3a is at the receiving end of an OAM loopback, the management processor 50 modifies the loopback indication value in the cell, and inserts the "backward" cell via the management FIFO 45 and the multiplexer 53 (or via the switch of FIG. 3b) into an ATM cell stream. Likewise, where the apparatus 20 is originating an OAM loopback cell, the management processor 50 generates the appropriate OAM loopback cell and inserts the "forward" cell via the management FIFO 45 and the multiplexer 53 into the ATM cell stream. Further, as will be discussed with respect to FIGS. 4–6, where the OAM cell being received is the result of a physical loopback, the management processor recognizes and declares the physical loopback.

Figure 3B:
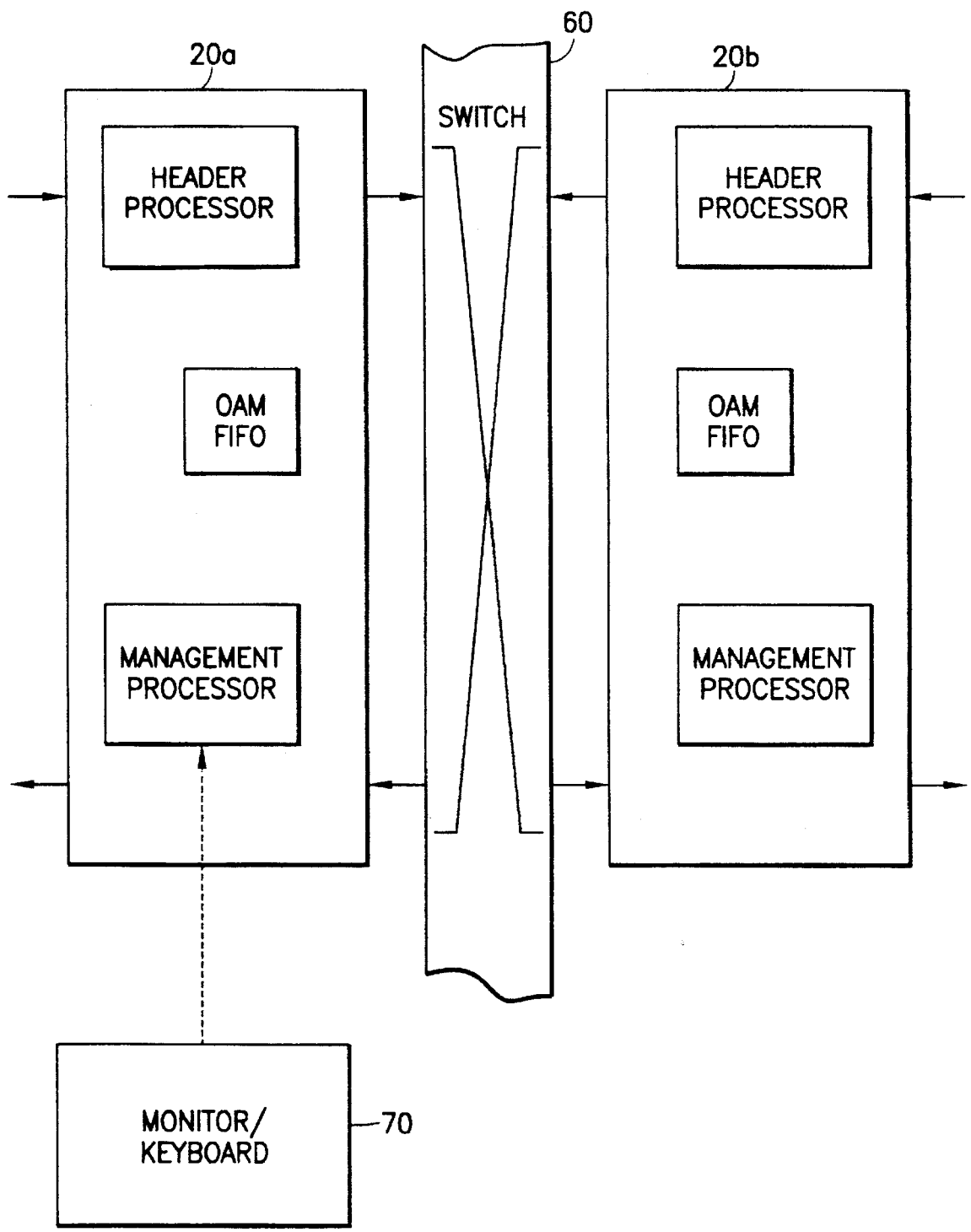
FIG. 3b is a block diagram of a system utilizing the apparatus of the invention in conjunction with a terminal and a switch fabric.

Before turning to details of the OAM management processor, it should be appreciated that the apparatus of the invention is typically arranged as part of a larger system as seen in FIG. 3b. Thus, as seen in FIG. 3b, identical units 20a and 20b are seen with a cross-connect switch 60 therebetween. The management processor 50 (and if desired the header processor 30 via the management processor 50 and routine RAM 35) is coupled to a monitor/keyboard system 70 which permits the management processor to be programmed as desired. Thus, in accord with one preferred aspect of the invention, the monitor/keyboard system 70 can be used to change a default time used by the management processor in deciding whether an OAM loopback cell has been lost. Thus, if there is reason to believe that the transit time for the OAM loopback might exceed the five seconds allocated by the ITU-T standard for the timeout, a user can prevent false indications of no-loopback-detected, by increasing the timeout provided by the timer 51 beyond an expected transit time. In accord with another preferred aspect of the invention, the monitor/keyboard system 70 can be used to program the management processor to automatically repeat the loopback test by a number of times selected by the user in the absence of a return cell being detected. The desired number of repeats can be stored in a register (not shown) associated with the management processor, and the management processor 50 can compare the number of times it has unsuccessfully tried a loopback to the stored number to determine whether it should try again. This retry capability is particularly useful where there is reason to believe that the transit media or devices may introduce an error affecting the ATM cells on the connection path. In accord with yet another preferred aspect of the invention, the number of retries which occur before a successful loopback is obtained may be displayed for the user on monitor 70.

As previously indicated, and as should be apparent from FIG. 3b, by utilizing a switch 60 coupled to the apparatus 20a, there is no need for the multiplexer 53 seen in FIG. 3a, as the switch 60 can be used for multiplexing purposes.

Figure 4:
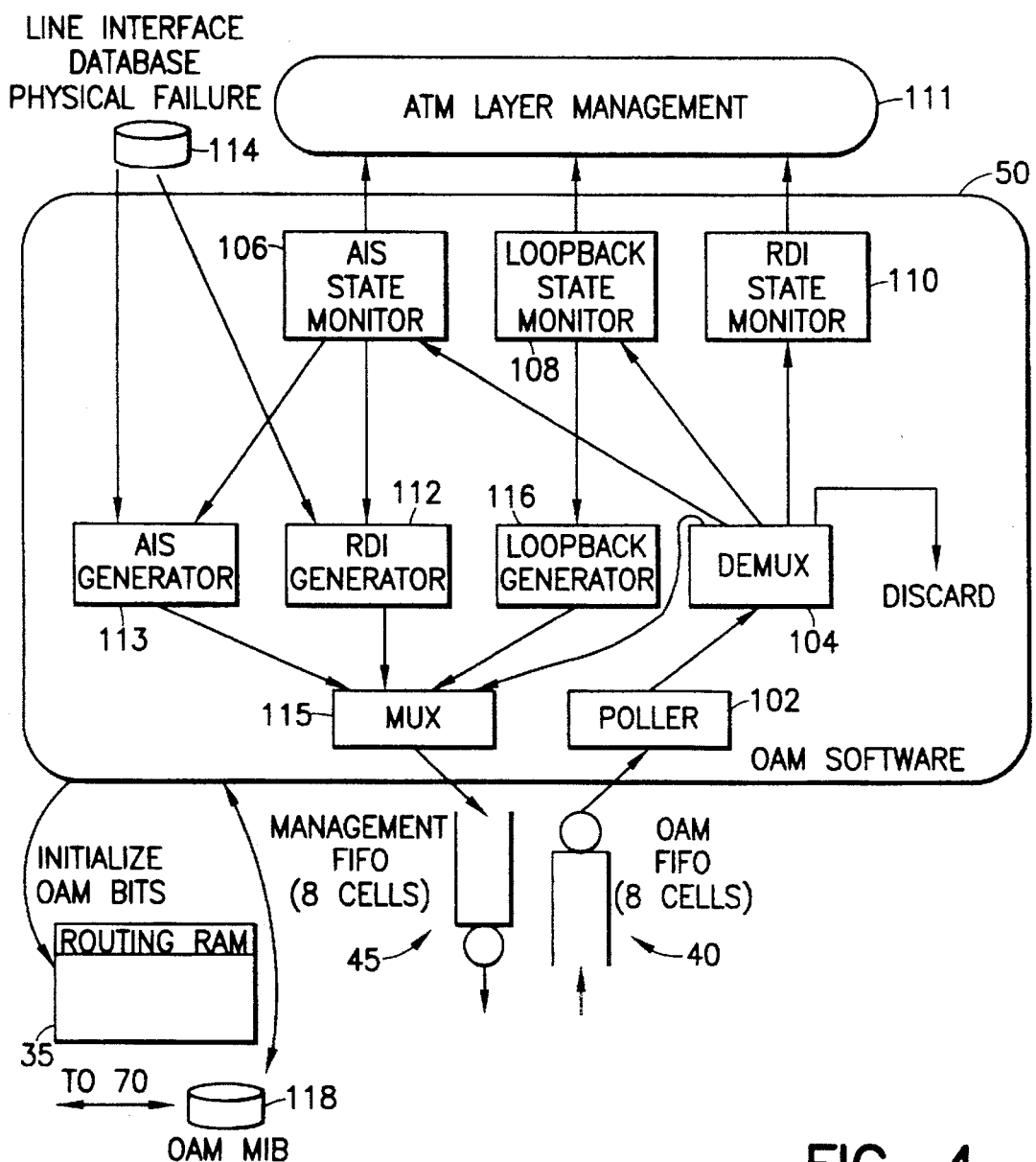
Figure 5:
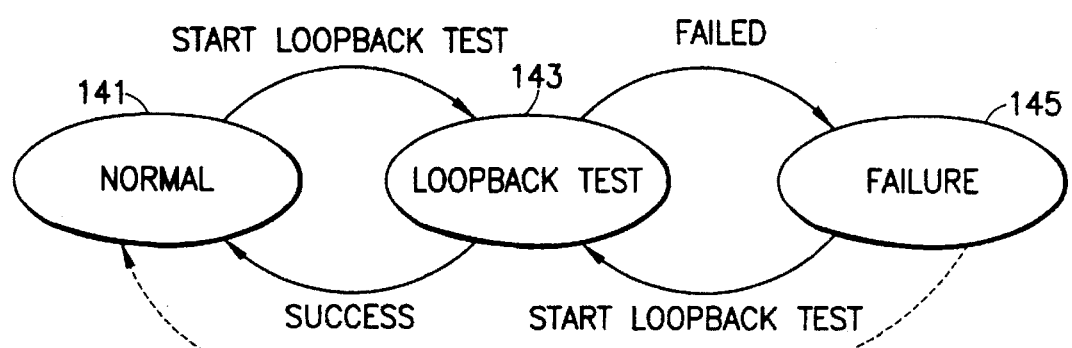
FIG. 5 is a state diagram of the loopback state monitor of FIG. 4.

Turning now to FIG. 4, a functional block diagram of the OAM management processor 50 (which is preferably implemented in a Motorola 68302 microprocessor) of FIG. 3a is seen. Thus, the poller 102 of the management processor 50 periodically polls the OAM FIFO 40 to see whether data is present. Depending on the OAM function type (as determined by the Function Type field), the OAM cells are demultiplexed by demultiplexer 104 and processed by the AIS state monitor 106, the loopback state monitor 108, or the RDI state monitor 110 which all report to ATM layer management 111. The AIS state monitor 106 is usually at a normal state. If an AIS cell is received, the state is changed to the AIS state which triggers AIS cells by the AIS generator 113 in the forward direction or triggers the RDI generator 112 to generate RDI OAM cells in the reverse direction for potential channel conditioning. Likewise, AIR and RDI cells may be generated in the reverse direction due to a line interface determination as indicated at 114. All AIS and RDI cells are preferably transmitted by the management processor via the internal multiplexer 115 and the management FIFO 45. Of particular interest for the instant application, however, is the loopback state monitor 108 and the loopback generator 116. The loopback state monitor 108 monitors the connectivity of the virtual path or virtual channel connection, segment or end-to-end, at the loopback injection point of the connection. As seen with reference to FIG. 5, the connection is usually in the normal state 141. If a loopback test is activated, the state will switch to the loopback test state 143. In the loopback test state, the loopback cell generator 116 (FIG. 4) generates and transmits a forward loopback OAM cell with a correlation tag and waits for the cell to return. If the cell returns (as discussed with reference to FIG. 6) within the timeout set for it, the loopback succeeds and the loopback monitor 108 returns to the normal state 141. However, if the cell does not return within the timeout, the loopback monitor enters the failure state 145. According to one embodiment of the invention, upon entering the failure state 145, a loopback failure can be declared, and the state of the loopback state monitor may be reset to the normal state 141. Alternatively, and in accord with a preferred aspect of the invention, instead of immediately declaring a loopback failure, the loopback generator 116 returns from the failure state 145 to the loopback test state 143 and causes another loopback cell to be injected. If that cell is not returned within the timeout, the loopback generator 116 again returns to the failure state 145. This process is repeated for up to a desired number of cells as programmed by the user via terminal 70 and, if available, an SNMP management interface base (MIB) 118. After all cells fail to return, the loopback failure is then declared. Afterwards, the state may be reset to the normal state.

Figure 6:
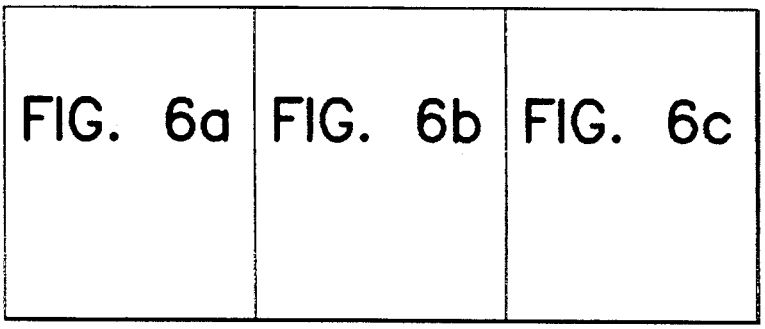
FIG. 6 (represented as FIGS. 6A, 6B and 6C on three separate sheets) is a flow chart of the management processor loopback cell received routine of the invention carried out by the OAM management processor of FIG. 4.
Figure 6A:
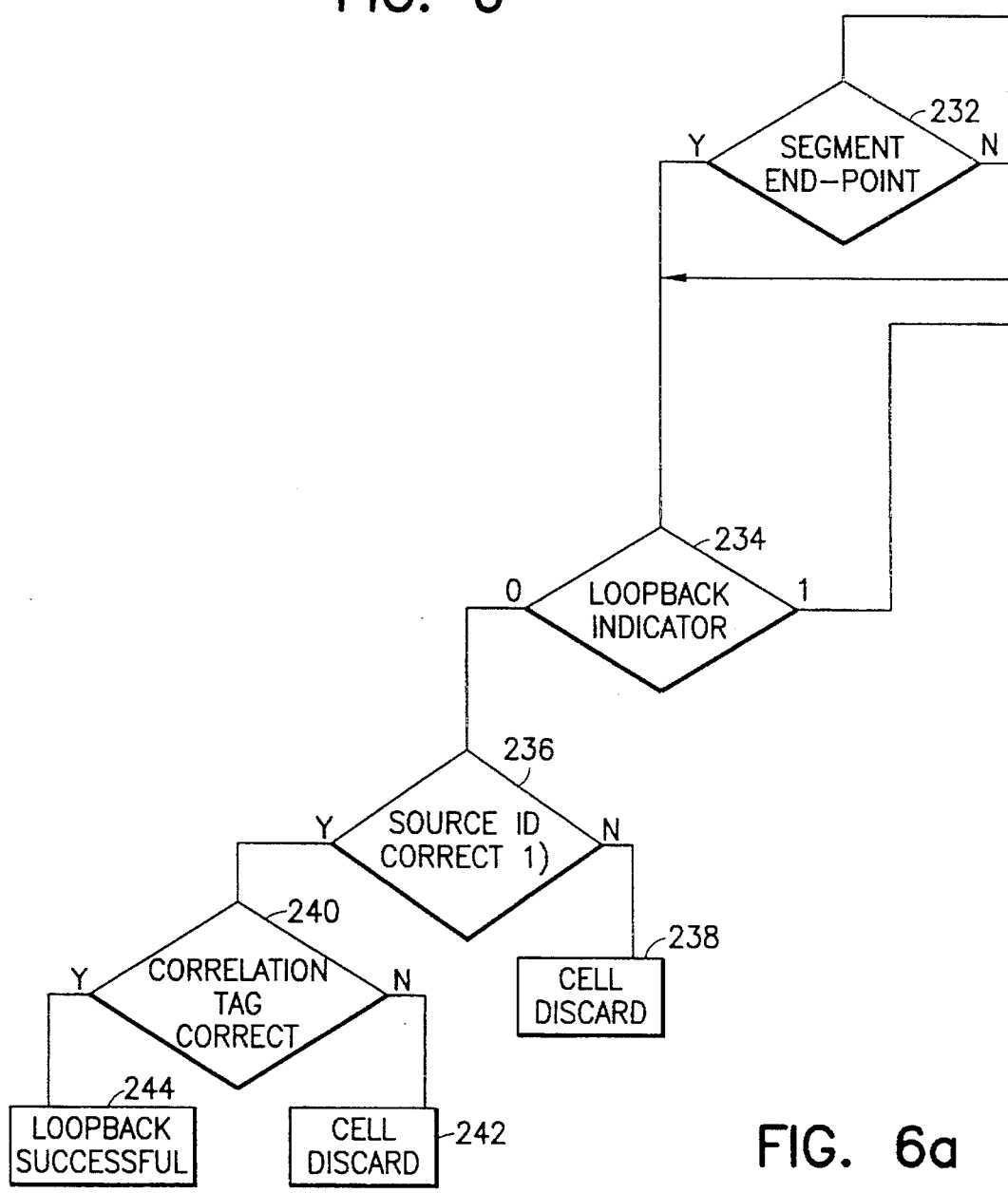
Figure 6B:
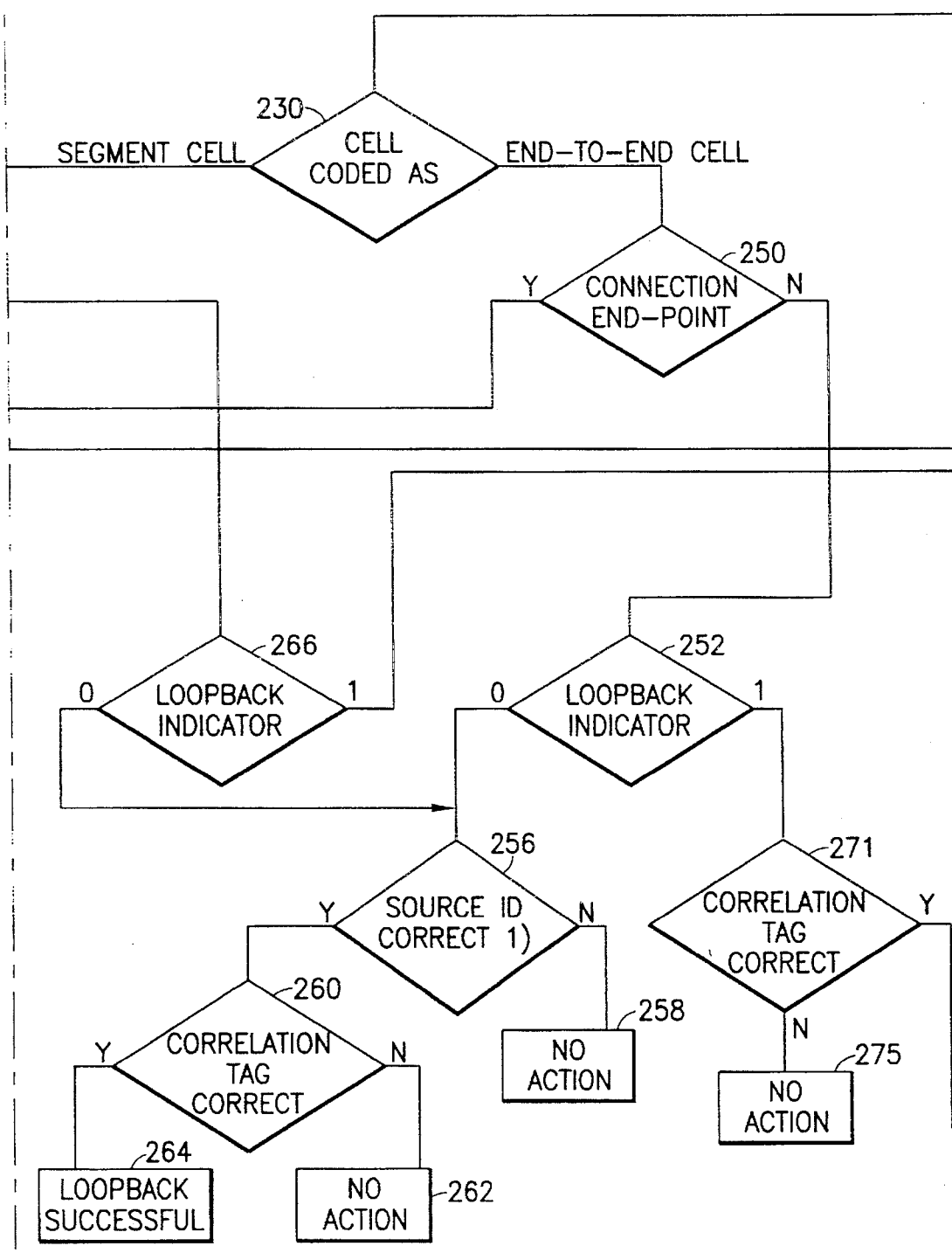
Figure 6C:
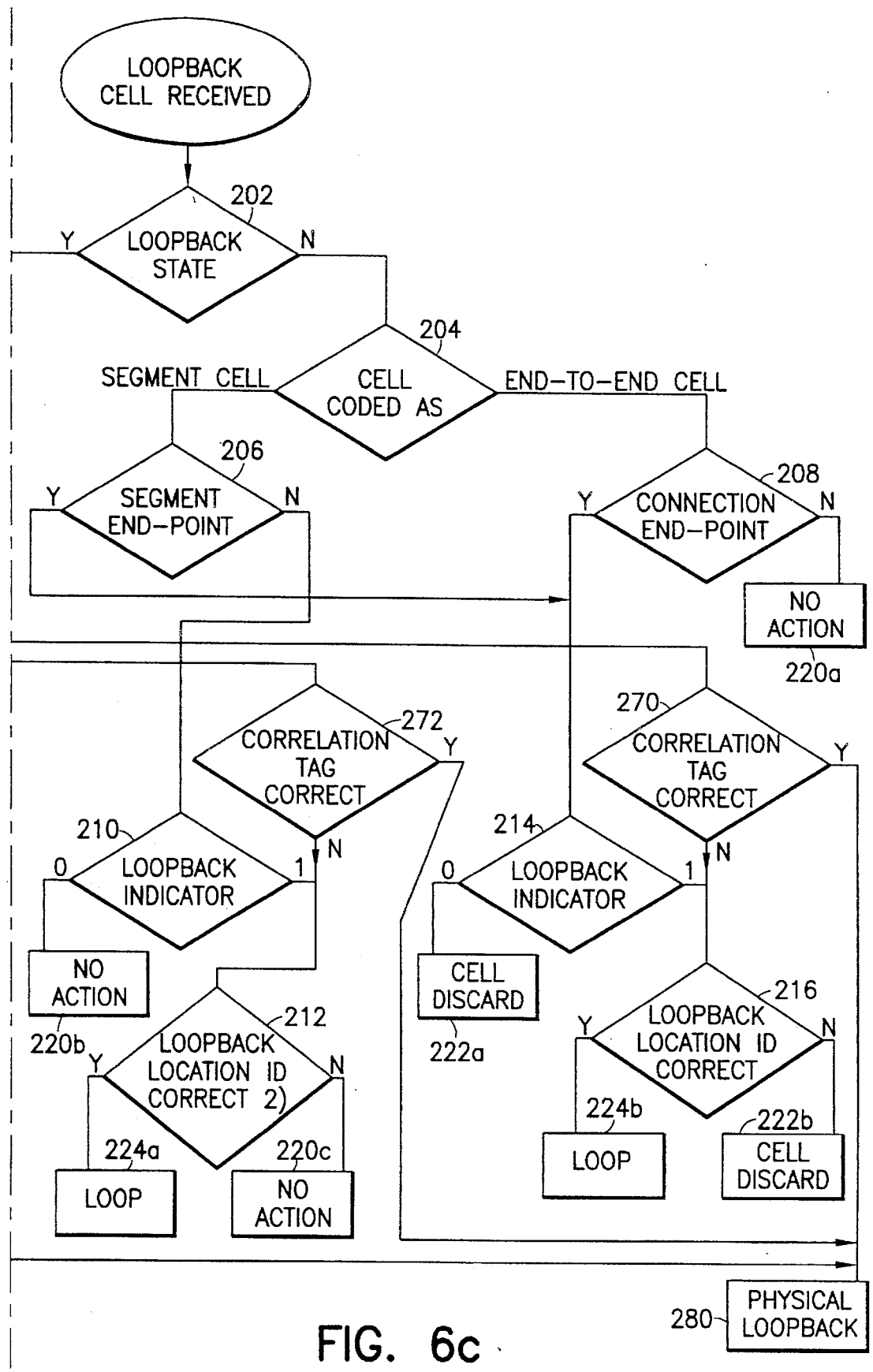

Turning now to FIG. 6, a flow chart of program of the loopback state monitor 108 of the management processor 50 is seen. When a loopback cell is received, the loopback state monitor 108 determines at 202 whether the monitor is in a loopback state. If the monitor is not in a loopback state, then the steps indicated by decision blocks 204, 206, 208, 212, 214, and 216 are undertaken in accord with recommendation I.610, leading to determinations of no action at 220a, 220b, and 220c, a discarding of the cell at 222a and 222b, or a looping of the cell at 224a and 224b (typically preceded by changing the cell direction). However, if the monitor is in a loopback state, at 230, a determination is made as to whether the cell is coded as a segment cell or an end-to-end cell. If the cell is coded as a segment cell, a determination is made at 232 as to whether the apparatus is a segment end-point or not. If yes, at 234, a determination is made as to what the loopback indicator bit value is. If it is a "1" indicating a forward cell, the program continues at step 270 as discussed below. However, if it is a "0", indicating a backward cell, the source ID is checked at step 236. If the source ID is incorrect, the cell is discarded at 238. However, if the source ID is correct, at 240, the correlation tag is checked. If the correlation tag is incorrect (i.e., it does not match with a stored correlation tag of what was an outgoing loopback cell), the cell is discarded at 242. If the correlation tag checked at 240 is correct, a successful loopback is declared at 244.

Returning to step 230, if the cell was coded as an end-to-end cell, then at step 250, a determination is made as to whether the apparatus is a connection end-point. If so, at step 234, the loopback indicator bit is checked, and if indicative of a backward cell, the program continues with steps 236, etc. If the apparatus is not a connection end-point, then at 252, the loopback indicator bit is checked. If it is a "1" which is indicative of a forward cell, the program continues at 271 as will be discussed below. However, if it is a "0" which is indicative of a backward cell, the source ID is checked at 256. If the source ID is incorrect, no action is taken at 258; but if the source ID is correct, then at 260 the correlation tag is checked. If no match is found for the correlation tag, at 262 no action is taken. However, if a match is found, at 264 a successful loopback is declared.

It is noted that where a cell is coded as a segment cell, but the apparatus is not a segment end-point as determined at 232, at step 266, the loopback indicator bit is checked. If the bit is indicative of a backward cell, the program continues with steps 256, etc. However, if the bit is indicative of a forward cell, the program continues at step 272 as discussed below.

Those skilled in the art will appreciate that steps 202 through 266 are exactly as dictated by Recommendation I.610. However, in accord with the invention, a determination at steps 234, 252, or 266 that the loopback indicator bit is a "1" and therefore indicates a forward cell causes different results than what occurs in Recommendation I.610. In particular, if in the loopback state, a cell coded as a segment cell is received at a segment end-point, or a cell coded as an end-to-end cell is received at a connection end point, and the loopback indicator bit of that cell indicates a forward cell, at step 270 a determination is made as to whether the correlation tag of the incoming cell matches a stored correlation tag. If not, the program continues at steps 216, etc. However, if the correlation tag does match a stored tag, a physical loopback is declared at 280. Likewise, if in the loopback state, a cell coded as a segment cell is received at an apparatus which is not a segment end-point, or a cell coded as an end-to-end cell is received at an apparatus which is not a connection end-point, and the loopback indicator bit of that cell indicates a forward cell, then at steps 271 or 272 a determination is made as to whether the correlation tag of the incoming cell matches a stored correlation tag. In the case of step 271, if the correlation tags do not match, no action is taken at step 275. Likewise, in the case of step 272, if the correlation tags do not match, the program continues at steps 212, etc. However, in either case, if the correlation tag does match a stored tag, a physical loopback is declared at 280.

There has been described and illustrated herein an apparatus and method for detection of OAM cell loopback and physical loopbacks in an ATM network. While particular embodiments of the invention have been described, it is not intended that the invention be limited thereto, as it is intended that the invention be as broad in scope as the art will allow and that the specification be read likewise. Thus, while certain apparatus was disclosed for detecting physical and OAM cell loopbacks, it will be appreciated that other equivalent apparatus could be utilized. For example, one or more RAMs could be used for storing data instead of FIFOs. Likewise, the functions of the management processor and the header processor could be divided and implemented with discrete circuitry or other components. In addition, the need for certain circuitry such as a FIFO might depend upon the speed of the processors, as a high speed management processor might be able to generate an OAM cell and insert the OAM cell directly into the data stream. Furthermore, while a particular flow chart was provided which indicates that first the loopback indicator is checked prior to checking the correlation tag, it will be appreciated that these steps could be accomplished in a different order. It should also be appreciated that while the invention is described in terms of identifying and declaring a "physical loopback", the term "physical loopback" is intended to be interpreted in a broad sense to include all non-OAM type loopbacks. While in the vast majority of cases the reason an originating apparatus will receive back a "forward" loopback cell which it originated will be a hard-wired (physical) loopback, it is conceivable that other circumstances might generate such an occurrence. Thus, within the invention, any declaration of a "physical loopback" condition is intended to cover a declaration of a non-OAM loopback condition, however phrased. It will therefore be appreciated by those skilled in the art that yet other modifications could be made to the provided invention without deviating from its spirit and scope as so claimed.

We claim:

1. A method for running an ATM OAM loopback test utilizing an apparatus, said method comprising:

a) sending an outgoing OAM loopback test cell with a loopback indication value representing a forward test cell, and with a correlation tag;

b) storing said correlation tag of said outgoing OAM loopback test cell;

c) upon receiving an incoming OAM loopback test cell, determining the value of a loopback indication of said incoming OAM loopback test cell;

d) comparing a correlation tag of said incoming OAM loopback test cell with said stored correlation tag; and e) declaring a physical loopback condition if said correlation tag of said incoming OAM loopback test cell matches said correlation tag of said outgoing OAM loopback test cell and the value of said loopback indication of said incoming OAM loopback test cell represents a forward test cell.

2. A method according to claim 1, further comprising:

declaring a successful OAM loopback condition if said correlation tag of said incoming OAM loopback test cell matches said correlation tag of said outgoing OAM loopback test cell and the value of said loopback indication of said incoming OAM loopback test cell represents a backward test cell.

3. A method according to claim 1, further comprising:

f) prior to said determining the value of said loopback indication of said incoming OAM loopback test cell, determining whether the apparatus is in a loopback state awaiting a looped back cell, and if the apparatus is not in said loopback state, either discarding, looping back, or taking no action on said incoming OAM loopback test cell.

4. A method according to claim 1, further comprising:

prior to said determining the value of said loopback indication of said incoming OAM loopback test cell, setting a timeout, and tracking the time from when said outgoing OAM loopback cell was sent, and if said incoming OAM loopback test cell is not received back within said timeout, sending another outgoing OAM loopback test cell.

5. A method according to claim 4, further comprising:

repeating step f) a predetermined number of times, and if no said incoming OAM loopback test cell is received back within said timeout, declaring a failed loopback condition.

6. A method according to claim 3, further comprising:

prior to said determining the value of said loopback indication of said incoming OAM loopback test cell, setting a timeout, and tracking the time from when said outgoing OAM loopback test cell was sent, and if said incoming OAM loopback test cell is not received back within said timeout, sending another outgoing OAM loopback test cell.

7. A method according to claim 6, further comprising:

repeating step f) a predetermined number of times, and if no said outgoing OAM loopback test cell is received back within said timeout, declaring a failed loopback condition.

8. A method according to claim 4, wherein: p1 said timeout is set to greater than five seconds.

9. A method according to claim 5, wherein:

said predetermined number of times is greater than one.

10. A method according to claim 7, further comprising:

declaring a successful OAM loopback condition if said correlation tag of said incoming OAM loopback test cell matches said correlation tag of said outgoing OAM loopback test cell and the value of said loopback indication of said incoming OAM loopback test cell represents a backward test cell.

11. A telecommunications apparatus, comprising:

a) first memory means for storing ATM data;

b) header processor means for receiving an incoming ATM formatted data stream, for identifying in the ATM formatted data stream an incoming OAM loopback test cell having a first loopback indication value and a first correlation tag, and for forwarding at least said first loopback indication value and said first correlation tag of said incoming OAM loopback cell to said first memory means; and c) management processor means coupled to said first memory means, said management processor means for generating an outgoing ATM OAM loopback cell with a second loopback indication and a second correlation tag, for storing a copy of said second correlation tag, for inserting said outgoing ATM OAM loopback cell into an outgoing ATM formatted data stream, for determining the value of said first loopback indication value placed into said first memory means by said header processor means, for comparing said first correlation tag of said incoming OAM loopback test cell with said copy of said second correlation tag of said outgoing ATM loopback cell, and for declaring a physical loopback condition if said first correlation tag matches said copy of said second correlation tag and the value of said first loopback indication represents a forward test cell.

12. A telecommunications apparatus according to claim 11, wherein:

said management processor means further comprises means for declaring a successful OAM loopback condition if said first correlation tag matches said copy of said second correlation tag and the value of said first loopback indication represents a backward test cell.

13. A telecommunications apparatus according to claim 11, wherein:

said management processor means includes associated second memory means for storing said copy of said second correlation tag.

14. A telecommunications apparatus according to claim 11, wherein:

said first memory means comprises a FIFO.

15. A telecommunications apparatus according to claim 11, further comprising:

timing means for setting a timeout and tracking the time from when said outgoing ATM OAM loopback cell with said second loopback indication and said second correlation tag is sent.

* * * * *